United States Patent [19]

Johnson et al.

[11] Patent Number: 5,034,895
[45] Date of Patent: Jul. 23, 1991

[54] ENHANCED PERFORMANCE BIAS INTEGRATOR FOR MARINE AUTOMATIC PILOT SYSTEM

[75] Inventors: Jeffrey C. Johnson, Charlottesville; Rebecca A. Bird, Earlysville; David A. Bennett, Charlottesville, all of Va.

[73] Assignee: Sperry Marine Inc., Charlottesville, Va.

[21] Appl. No.: 460,488

[22] Filed: Jan. 3, 1990

[51] Int. Cl.[5] .................. G06F 15/50; G05D 1/02
[52] U.S. Cl. ............................... 364/457; 364/447; 318/588; 114/144 RE
[58] Field of Search .............. 364/447, 457, 434; 318/588; 114/144 RE

[56] References Cited

U.S. PATENT DOCUMENTS

| | | | |
|---|---|---|---|
| 4,069,784 | 1/1978 | Hedström et al. | 114/144 E |
| 4,074,648 | 2/1978 | Reid et al. | 114/144 E |
| 4,253,149 | 2/1981 | Cunningham et al. | 364/444 |
| 4,336,594 | 6/1982 | Mauzawa et al. | 364/457 |
| 4,524,710 | 6/1985 | Scott | 114/275 |
| 4,590,570 | 5/1986 | Rader | 364/452 |
| 4,692,868 | 9/1987 | Wesner et al. | 364/447 |
| 4,747,359 | 5/1988 | Ueno | 114/144 B |
| 4,769,773 | 9/1988 | Shatto, Jr. | 364/424.01 |
| 4,777,602 | 10/1988 | Wesner | 364/457 |
| 4,799,163 | 1/1989 | Wesner | 364/457 |

Primary Examiner—Thomas G. Black
Attorney, Agent, or Firm—Seymour Levine

[57] ABSTRACT

The rudder order bias integrator of a marine autopilot is reactivated upon substantial completion of a turning maneuver in response to heading error, heading rate and the derivative portion of the rudder order signal. Upon reactivation, the integrator time constant is ramped from a predetermined small value to the normal large time constant of the integrator.

10 Claims, 3 Drawing Sheets

ENHANCED PERFORMANCE BIAS INTEGRATOR FOR MARINE AUTOMATIC PILOT SYSTEM

BACKGROUND OF THE INVENTION

1. Field of the Invention

The invention relates to automatic control for steering systems of marine vessels, otherwise referred to as marine autopilots. The invention is particularly concerned with the integral channel of a PID autopilot with proportional, integral and derivative channels. Specifically, the invention relates to the rudder order bias integrator of such systems.

2. Description of the Prior Art

Marine autopilots are known in the art that provide automatic steering control of marine vessels. Such a system is disclosed in U.S. Pat. No. 4,074,648, issued Feb. 21, 1978, entitled "Adaptive Autopilot for Marine Vessels" by Reid and Wesner; U.S. Pat. No. 4,692,868, issued Sept. 8, 1987, entitled "Adaptive Autopilot" by Wesner et al; U.S. Pat. No. 4,777,602, issued Oct. 11, 1988, entitled "Digital Autopilot Controller for Marine Vessels", by Wesner; and U.S. Pat. No. 4,799,163, issued Jan. 17, 1989, entitled "Autopilot with Adaptive Weather Adjustment for Marine Vessels" by Wesner. Said U.S. Pat. Nos. 4,074,648, 4,692,868, 4,777,602, and 4,799,163 are assigned to the assignee of the present invention and are incorporated herein by reference.

Such systems include a rudder order bias integrator for removing heading keeping course offset. The rudder order bias integrator automatically computes a bias as a component of rudder order having the effect, in the steering control loop, of removing any bias that may be present in the heading error. Heading error bias results from non-zero average or mean moments acting on the ship. Such moments, which are due to wind and seaway effects or hull, propulsion, or cargo asymmetries, require a non-zero mean rudder position to maintain the ship on course. The bias generated by the integrator automatically provides the rudder correction required to maintain the mean heading aligned to the ordered course. Whenever the course is changed significantly, the bias integrator adapts to the new weather and seaway effects of the newly acquired course at sea.

In the prior art, during a course change, the bias integration function is disabled until the new course is achieved in order to prevent integration of heading error that is not associated with the non-zero mean hull moments. After achievement of the new course, the bias integration function is reactivated in order to begin computing the rudder order bias required on the new course. In the prior art, the bias integration function is reactivated after a fixed period of time, for example, 120 seconds, following the time that the heading error has diminished to within a specific value, for example, 10°.

The rate at which the prior art bias integrator corrects the non-zero mean moments is determined by a fixed value integration time constant. The integration time constant is selected large enough to prevent the bias integrator from responding to short term variations of heading error. A large integration time constant, however, results in a correspondingly long period of time for the bias integrator to achieve the required bias for a new course after a course change.

It has been observed on ships at sea that the bias integrator adapts so slowly after course changes that helmsman adjust the course selector of the autopilot for many minutes after completion of a turn in order to maintain the desired ship heading. It is undesirable that an automatic control system should require continuous manual adjustment, but this is the situation with prior art designs. The time that the prior art integrators require to detect the end of a maneuver to a new course and accordingly reactivate integration, as discussed above, increases the already long time for the bias integrator to settle out to the new output because of the long integration time constant. This combination of excessive time periods results in the long delay for the prior art integrator to finally reduce the mean heading error to zero after a course change. Typically, the helmsman adjusts the course selector during this period of time in order to "assist" the autopilot in quickly achieving and maintaining the ordered course.

SUMMARY OF THE INVENTION

The above shortcomings of the prior art are overcome by an enhanced rudder order bias integrator system that detects the end of maneuver by the magnitudes of the heading error and heading rate, and reactivates rudder order bias integration in accordance therewith. Preferably, the portion of the rudder order from the rate channel is also utilized to determine when the maneuver is completed. Additionally, bias integration commences with a relatively small integration time constant which then increases over a controllable period of time to the normally large integration time constant.

DESCRIPTION OF THE PREFERRED EMBODIMENT

Figure 1:
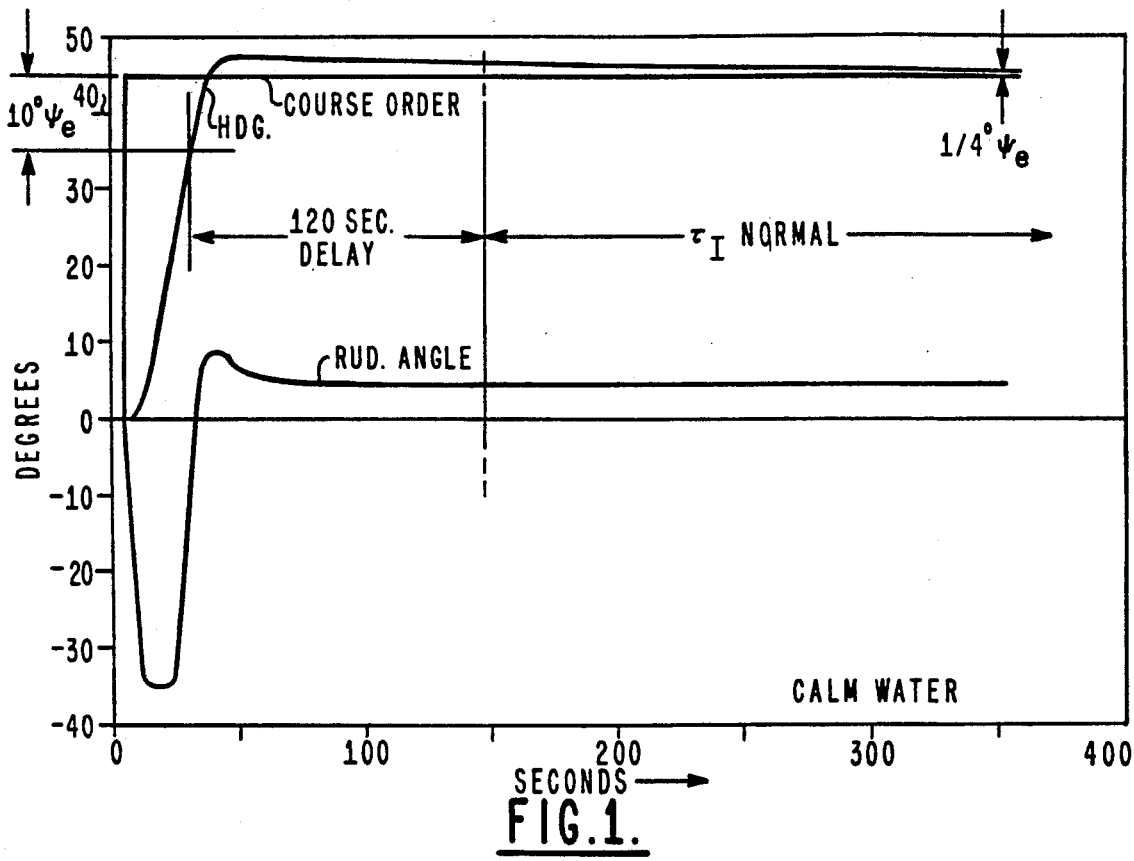
FIG. 1 is a graph illustrating conventional bias integrator operation during a course changing maneuver.

Referring to FIG. 1, a graph of a simulated autopilot controlled ship with conventional operation of the rudder order bias integrator is illustrated. The ship is maneuvering from a current heading of 0° to an ordered course of 45° with an assumed wind of 51 knots, a wind direction from 0° and calm seas with no waves. The course change from 0° to 45° is relative to the wind direction and the presence of a strong wind causes a heading bias. As illustrated, when the heading error diminishes to 10°, the end of maneuver waiting time of the prior art integrator is initiated (typically 120 seconds). At the end of the 120 second delay, the bias integrator is reactivated with the normal long time constant $Tau_I$.

The bias integrator functions during the Automatic Course Keeping modes of the system. The functioning of the bias integrator is also governed by the currently selected steering controller (not shown) of the autopilot system. The autopilot system has three steering controller modes; viz, Rate Control mode for course changes with controlled Rate-of-Turn, Maneuver Control mode for faster turns with larger rudder excursions, and Heading Keeping control mode for maintaining course with minimal rudder activity. The Maneuver controller is also utilized after rate-controlled turns as a transition into Heading Keeping control.

Figure 3:
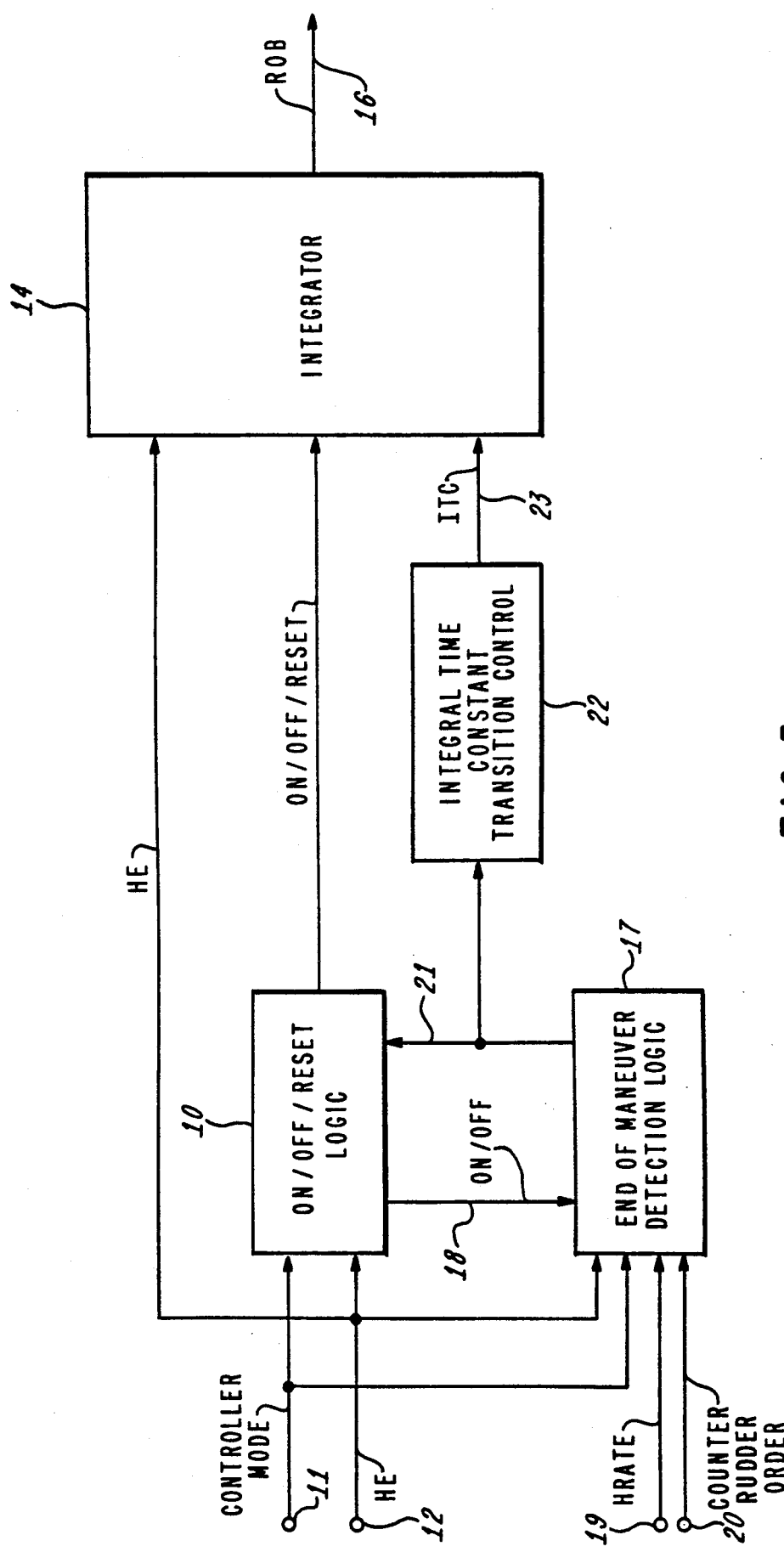
FIG. 3 is a schematic block diagram illustrating the enhanced bias integrator system of the present invention.

Referring to FIG. 3, On/Off/Reset logic 10 responsive to a controller mode signal at an input 11 and a heading error signal (HE) at an input 12 provides an On/Off/Reset signal on a line 13 to a rudder order bias integrator 14. The mode signal at the input 11 designates the current controller mode; viz, Rate-of-Turn, Maneuvering, or Heading Keeping. The integrator 14 is also responsive to the heading error signal at the input 12 and provides a rudder order bias (ROB) signal on a line 16. The integrator 14 integrates the heading error signal at the input 12 to provide the ROB signal on the line 16. In a manner to be further described, the On-/Off/Reset signal on the line 13 controllably activates and deactivates the integrator 14 as well as resets the integrator 14 to a calibrated baseline which may be 0°.

End of Maneuver Detection logic 17 receives an On/Off signal indication on a line 18 from the logic 10. The signal on the line 18 indicates whether the integrator 14 is currently on or off. The logic 17 also receives the controller mode and heading error signals from the inputs 11 and 12 as well as receiving a heading rate (HRATE) signal at an input 19 and a counter-rudder order signal at an input 20. The logic 17 provides an End of Maneuver indication signal on a line 21 indicating that the system has determined that the maneuver is substantially ended. The end of Maneuver indication signal on the line 21 is provided to the logic 10 which in response thereto reactivates the integrator 14.

An Integral Time Constant Transition Control 22 responsive to the End of Maneuver indication on the line 21 provides an Integral Time Constant (ITC) signal to the integrator 14 on a line 23. The control 22 controls the time constant of the integrator 14 in a manner to be described.

Figure 4:
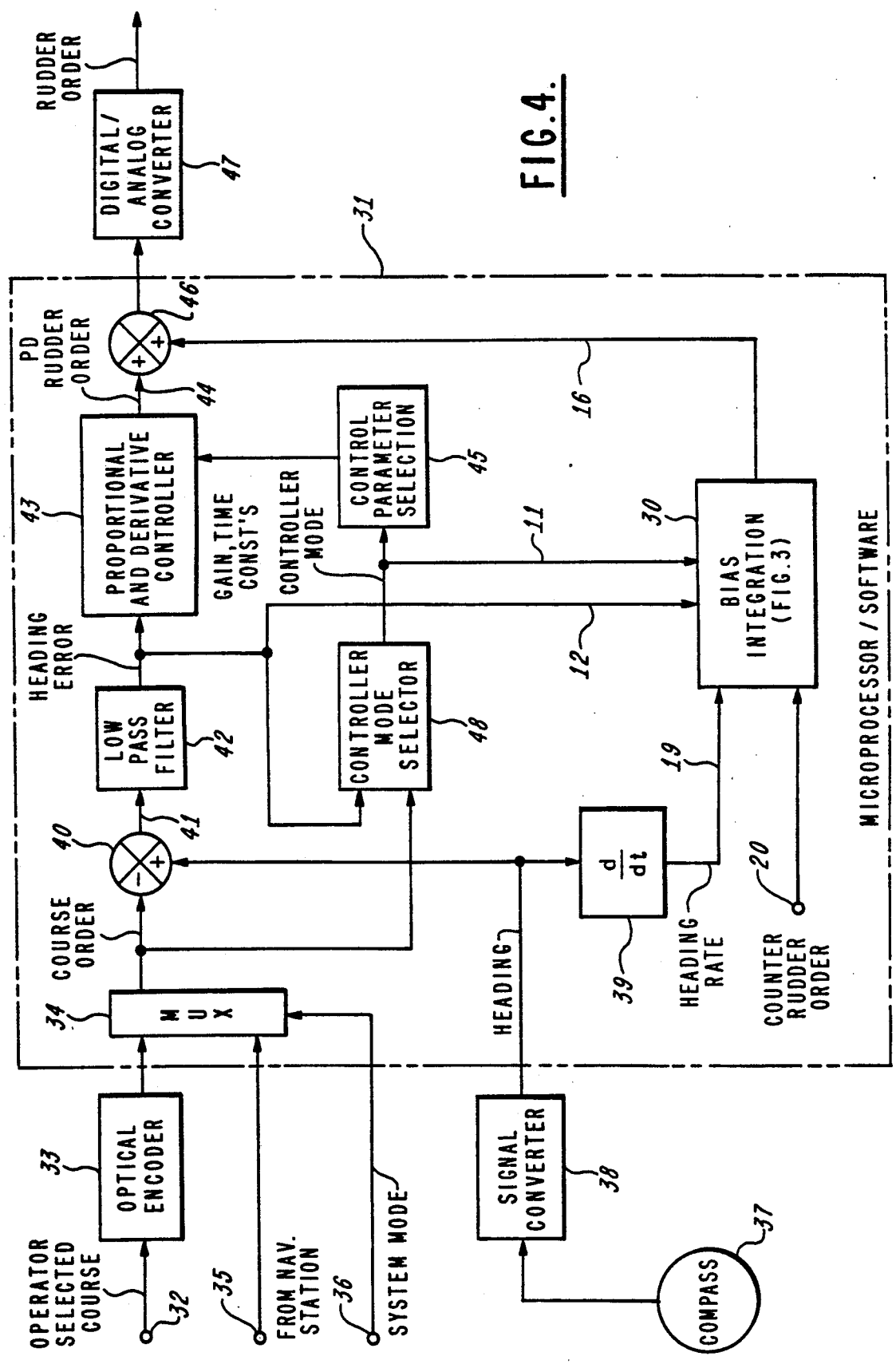
FIG. 4 is a schematic block diagram illustrating a system incorporating the apparatus of FIG. 3.

Referring to FIG. 4, where like reference numerals indicate like components with respect to FIG. 3, the hardware/software system that incorporates the bias integration system of FIG. 3 is illustrated. The bias integration function of FIG. 3 is denoted by a block 30. The system of FIG. 4 includes a microprocessor/software section 31 which includes the bias integration function 30. The remainder of FIG. 4 is comprised of hardware. The primary data required by the bias integrator are counter rudder order, ship's heading rate, heading error, and controller mode. In the Automatic steering mode, the operator sets the course order on a course dial (not shown) of the autopilot as depicted by an input 32. The operator selected course is encoded by a conventional optical encoder 33 and provided in digital form to a multiplexer 34. In the Navigational steering mode of the system, course order is received in serial data form from a navigation station (not shown). Preferably, conventional RS-232 serial data format is utilized. The Navigational mode course order from the navigation station is applied at an input 35 to the multiplexer 34. The system mode signal applied at an input terminal 36 indicates whether the system is in the automatic or navigation mode. The multiplexer 34 selects between the operator selected course order at the input 32 and the NAV mode course order at the terminal 35 in accordance with the system mode signal at the terminal 36.

Heading is input into microprocessor 31 from a compass system 37 through a suitable signal converter interface 38. Heading rate is obtained at the input 19 by processing the heading signal from the compass interface 38 through a differentiator 39. Heading rate is computed by comparing successive values of heading from the compass interface 38 at fixed time intervals. The compass heading provided by the compass interface 38 is subtracted from the ordered course provided by the multiplexer 34 in a summing junction 40 to provide heading error on a line 41. Heading error is filtered by a lowpass filter 42 to remove unwanted noise signals. The filtered heading error is applied to the bias integration function 30 via the input 12.

The filtered heading error is also applied to proportional and derivative controller channels 43 to generate PD rudder order on a line 44. Details of the PD portion 43 of the autopilot are described in the aforementioned patents. A control parameter selection block 45, responsive to the signal from the controller mode selector 48, provides gain parameters and time constant parameters to the PD controller 43, as described in the aforementioned patents. The selected controller is signaled to the bias integration function 30 via the input 11 thereof. It is appreciated that the bias integration function 30 forms the integral channel of the PID autopilot described in the aforementioned patents.

The rudder order bias signal on the line 16 is additively combined with the PD rudder order on the line 44 in a summing function 46 to form the digital rudder order from the processor 31. The digital rudder order signal from the summing function 46 is applied through a digital/analog converter 47 to provide the rudder order signal in analog format. It is appreciated that the derivative component of the order from the PD controller 43 provides the counter-rudder order input 20 to the bias integration function 30. This signal is that part of the rudder order computed with respect to the rate of change of heading. The controller mode selection 48 chooses the heading keeping control mode whenever the maneuver controller maintains the heading error smaller than ±3° for a pre-selected period of time, say 88 sec. for a large containership. The maneuver control mode is selected for turns and whenever the heading keeping controller allows the heading error to exceed 10°. The rate of turn control mode is selected for turns when the operator also selects a specific rate of turn for the maneuver.

With continued references to FIGS. 3 and 4, the integrator always functions during Heading Keeping control but never functions during Rate controlled turns, since bias conditions are likely to be changing during the maneuver. The mode control signal from the Controller Mode Selection 48 controls these functions via the logic 10 and the logic 17. The integrator 14 functions during Maneuver control, when the course change is nearly complete, based on measurements of heading error, heading rate, and counter rudder order in a manner to be explained. This function is performed by the logic 17 providing the End of Maneuver indication signal on the line 21 to the logic 10. If, however, the conditions for the End of Maneuver indication are not satisfied, Bias integration is controlled to begin when heading error is continuously less than 10° for 2 minutes or Heading Keeping control becomes active. This function is effected by the logic 17.

Figure 2:
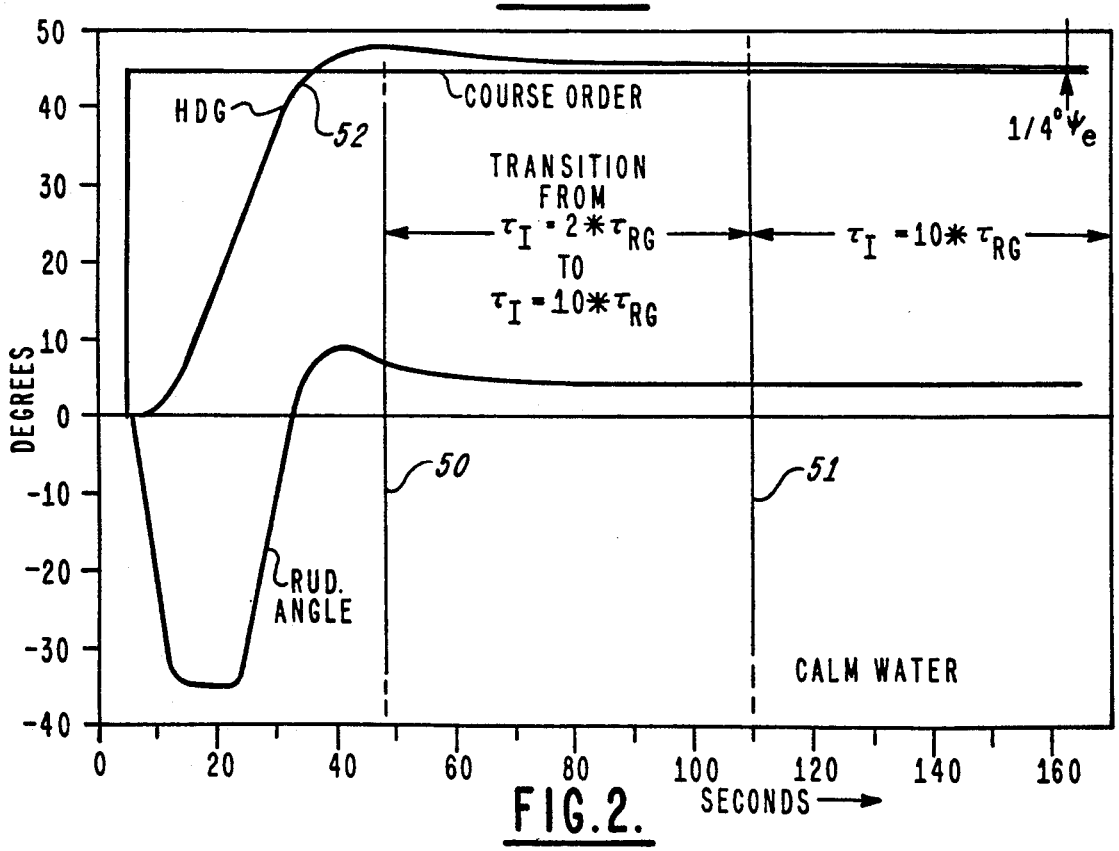
FIG. 2 is a graph illustrating bias integrator operation in accordance with the invention during a course changing maneuver.

Referring to FIG. 2, with continued reference to FIGS. 3 and 4, FIG. 2 illustrates a simulated autopilot controlled ship under conditions similar to those discussed with respect to FIG. 1, utilizing the fast integrator of the present invention. In accordance with the invention, the logic 17 generates the End of Maneuver indiction signal at a time 50, which, via the logic 10, reactivates the integrator 14. After bias integration is reactivated at the time 50, the Integral Time Constant Transition control 22 (FIG. 3) increases the time constant $Tau_I$ from a relatively fast value of, for example, two times a reference rate time constant $Tau_{RG}$ to the normal value of 10 times $Tau_{RG}$. The time constant transition ends at a time 51 and the time constant $Tau_I$ remains at the normal value thereafter until a further controlling event occurs. The transitional time constant values and the time 51 are controlled by the autopilot installer, in a manner to be described.

The logic 17 of FIG. 3 generates the End of Maneuver indication signal on the line 21 at the time 50, as illustrated in FIG. 2, when the heading rate first approaches zero at a point 52, provided that the counter rudder order is near zero and the heading error is less than ±10°. These criteria are applicable to a critically damped autopilot such as might be installed on a large ship such as a modern super tanker.

When the integrator 14 is not active, the Bias retains the current value thereof pending update when the Integrator 14 is reactivated. Thus, integration history is retained during small course changes utilizing the maneuver or Rate controller. The Bias is reset to a calibrated base line by the reset logic 10 (FIG. 3) at the start of Automatic or Navigation steering, and whenever the ordered course is changed by over 30°. Adjustments (not shown) are provided so that the installer can set the base line to compensate for permanent offsets due to ship asymmetry or otherwise the base line default value is 0°.

After reactivation, the Integrator 14 processes heading error and adds incremental changes to the base line bias to adjust for ship, propulsion, or cargo asymmetry and weather and seaway effects. The time constant of the integrator 14 is calibrated by the installer with separate time constants for Maneuver and Heading Keeping control. For Maneuver control, the time constant is scaled for ship speed as well. This time constant applies during long periods of activity of the Integrator 14.

As described above, whenever the Integrator 14 is initiated or reactivated, a faster time constant is transitionally utilized. The control 22 ramps the controlling time constant from the initial small value up to normal value. Both the initial time constant and the rate of ramping can also be set by the installer. The shortening of the time constant allows the Integrator 14 to quickly compute the new bias required at the end of a turn maneuver. The longer normal time constant avoids contaminating the bias value with temporary heading deviations while maintaining course.

The enhanced integrator of the present invention offers advantages over the prior art in the more sophisticated detection of the end of maneuver and faster acquisition of the rudder bias required at the new course. During turns, the control logic 17 of the Integrator 14 measures not just the magnitude of heading error as is done with respect to prior art integrators, but determines when heading rate becomes an indicator to reactivate rudder order bias integration. By examining heading error, heading rate and counter rudder order, the integrator control logic 17 rapidly determines when the turn is completed and rudder order bias computation should resume. These advantages are illustrated by a comparison of FIGS. 1 and 2. FIG. 1 illustrates the typical 120 second end of maneuver waiting time of the prior art integrator. FIG. 2 illustrates that, in contrast to the prior art, the invention immediately detects that the ordered course has been approximately acquired and reactivates the bias integration. The improvement in detection and reactivation time is about 100 seconds.

After the enhanced integrator of the present invention is reactivated, a faster time constant is temporarily utilized to compute the new bias value more quickly than with prior art integrators. The Integrator 14 gradually increases the time constant up to its normal value, rendering the bias less sensitive to short term deviations in heading error. The resulting rudder order bias closely reflects the sum of offsets due to weather and seaway effects as well as hull, propulsion, and cargo asymmetries very soon after maneuver completion. A comparison of FIGS. 1 and 2 illustrates this improvement. The integrator of the present invention reduces the steady state error $\frac{1}{4}°$ approximately 100 seconds faster, after starting, than the prior art as illustrated in FIG. 2. Because of the longer final time constant, the bias is not significantly affected by temporary heading error deviations during long term course keeping.

The improvement for the example illustrated in FIGS. 1 and 2, considering both the faster restart and the faster initial bias integration, is, in total approximately 200 seconds faster than the prior art. Thus, the enhanced integrator of the present invention eliminates the heading bias in one-third of the time required by the prior art.

The invention provides a rudder order bias integrator that quickly adapts to the changed weather and seaway effects of a newly acquired course at sea, thus quickly eliminating bias from the heading error. This quick adaptation minimizes manual intervention with the automatic steering control system.

While the invention has been described in its preferred embodiment, it is to be understood that the words which have been used are words of description rather than limitation and that changes may be made within the purview of the appended claims without departing form the true scope and spirit of the invention in its broader aspects.

We claim:

1. In an autopilot for marine vessels, said autopilot having a rudder order bias integrator, means for deactivating said integrator upon initiating a turning maneuver in response to an ordered course change and means for providing a heading error signal, an improvement comprising:

heading rate means for providing a heading rate signal, and reactivating means responsive to said heading error signal and said heading rate signal for reactivating said rudder order bias integrator upon substantial completion of said turning maneuver in accordance with said heading error signal and said heading rate signal.

2. The improvement of claim 1 wherein said autopilot includes a proportional channel responsive to said heading error signal for providing a rudder order proportional component proportional to said heading error signal, an integral channel including said integrator and responsive to said heading error signal for providing a rudder order integral component in accordance with the integral of said heading error signal and a derivative channel responsive to said heading error signal for providing a rudder order derivative component in accordance with the derivative of said heading error signal, said autopilot further including combining means for combining said proportional, integral and derivative components into a rudder order signal, said reactivating means being responsive to said rudder order derivative component for reactivating said rudder order bias integrator in accordance therewith.

3. The improvement of claim 2 wherein said reactivating means includes means for reactivating said integrator when said heading error signal is less than a predetermined magnitude and said heading rate signal is less than a preselected magnitude.

4. The improvement of claim 3 wherein said reactivating means includes means for reactivating said integrator when said derivative component of said rudder order signal is less than a predetermined level.

5. The improvement of claim 1 wherein said autopilot operates in a plurality of controller modes and provides a controller mode signal in accordance therewith, said reactivating means being responsive to said mode signal for controlling said integrator in accordance therewith.

6. The improvement of claim 5 wherein said controller modes include a heading keeping mode, said reactivating means including means for reactivating said integrator when said controller mode signal indicates an active heading keeping mode.

7. The improvement of claim 5 wherein said reactivating means includes means for reactivating said integrator when said heading error signal is continuously less than a predetermined amount for a predetermined time interval.

8. The improvement of claim 1 further including reset means for resetting said integrator to a predetermined base line when said ordered course change exceeds a predetermined angle.

9. The improvement of claim 1 further including time constant control means responsive to said reactivating means for increasing the time constant of said integrator from a predetermined small value to a predetermined large value upon reactivating said rudder order bias integrator.

10. The improvement of claim 9 wherein said time constant control means includes means for linearly increasing said time constant from said predetermined small value to said predetermined large value.

* * * * *